United States Patent [19]

Delebarre et al.

[11] Patent Number: 4,880,311
[45] Date of Patent: Nov. 14, 1989

[54] APPARATUS FOR SUPPLYING UNCLOGGING GAS TO FLUIDIZED BED APPARATUS

[75] Inventors: Arnaud Delebarre, Lille; Paul W. Witwicki, Bethune, both of France

[73] Assignee: Charbonnages DeFrance, Paris, France

[21] Appl. No.: 921,254

[22] Filed: Oct. 21, 1986

[30] Foreign Application Priority Data

Oct. 21, 1985 [FR] France ............................... 85 15580

[51] Int. Cl.$^4$ ............................................. B01F 13/02
[52] U.S. Cl. ..................................................... 366/101
[58] Field of Search ............... 110/205, 244, 245, 346; 134/166 C, 169 C, 7, 10; 34/57 A; 51/317, 439; 366/101, 106, 107, 3, 11; 426/294; 118/62, DIG. 5

[56] References Cited

U.S. PATENT DOCUMENTS

| | | | |
|---|---|---|---|
| 2,933,824 | 4/1960 | Jones .................................... | 34/57 A |
| 3,417,978 | 12/1968 | Suzukawa ............................ | 34/57 A |
| 3,818,606 | 6/1974 | Marcellini ........................... | 34/57 A |
| 4,308,806 | 1/1982 | Wemura et al. . | |
| 4,330,502 | 5/1982 | Engström ............................ | 34/57 A |
| 4,478,646 | 10/1984 | Kuwata et al. ...................... | 51/439 |

FOREIGN PATENT DOCUMENTS

| | | | |
|---|---|---|---|
| 0101893 | 7/1983 | European Pat. Off. . | |
| 0035276 | 4/1978 | Japan ................................... | 110/346 |
| 0053616 | 4/1980 | Japan ................................... | 110/245 |
| 0034009 | 4/1981 | Japan ................................... | 110/245 |

Primary Examiner—Harvey C. Hornsby
Assistant Examiner—Scott J. Haugland
Attorney, Agent, or Firm—Cushman, Darby & Cushman

[57] ABSTRACT

Fluidized bed apparatus comprises a perforated grid to which fluidizing gas is fed by way of a plurality of tubes to fluidize particles supported on the grid. Each tube is connected to a respective blow opening of the grid by way of an erect tubular end part.

Apparatus for supplying the openings of the grid with unclogging gas comprises a plurality of injection tubes, each arranged to extend within a corresponding tubular end part. Each injection tube has a number of lateral orifices for the passage of the unclogging gas to be supplied to the injection tube.

The unclogging gas is used to disaggregate any particles accumulating in said tubular end part during stoppages in operation of the bed.

7 Claims, 2 Drawing Sheets

APPARATUS FOR SUPPLYING UNCLOGGING GAS TO FLUIDIZED BED APPARATUS

BACKGROUND TO THE INVENTION

This invention relates to apparatus for supplying gas for unclogging the openings through which fluidising gas is supplied to a fuidisation bed.

The apparatus is useful with fluidisation grids which have openings for the fluidisation air which are likely to become blocked by falling solid particles.

The invention can be used with the fluidisation grids referred to as "fluidisation plates", which are grids having in their thickness funnel-shaped cavities in the upper part, for example inverted truncated pyramids or truncated cones to which fluidisation gas supply tubes are connected.

In order to obtain a satisfactory operation of a fluidized bed, it is important that the following two conditions are met: a suitable distribution, generally an equal distribution, of the flidisation gas through the openings of the grid is obtained; after each stoppage in fluidisation, the solid particles are put back into fluidisation and the grid openings are cleared, so that after the stoppage the restart of fluidisation of the bed can be carried out without obstruction of the individual fluidisation air tubes. This operation is referred to herein as unclogging.

Apparatus which offers a solution for unclogging is described in FR-A-2,171,945. This French patent specification describes apparatus in which the openings for blowing are supplied by individual tubes, which each contain a valve for adjusting the flow rate, a stop valve, a diaphragm and a means for arresting the particles, consisting of a syphon. If particles have accumulated in each syphon when the speed of the fluidisation gas has become insufficient or zero, they are driven off with compressed air, the stop valve then being shut, and fluidisation air is then supplied to the openings for blowing once again.

This device is effective, but it is complex and expensive, because as many valves, diaphragms and syphons have to be installed as there are openings in the grid.

Sometimes, the means for arresting particles which fall consists of at least one elbow formed by a horizontal part and a vertical part of each tube. Other constructional arrangements may be used to provide means for arresting the fall of particles during stoppages in operation.

An unclogging device which does not comprise a valve, a diaphragm or a syphon on each individual tube, but has a semipermeable component placed in the cross-section of each of the tubes which supply the blow openings of the grid is described in French patent application No. 85/08320, filed on July 3, 1985. This device is often satisfactory because it is simpler and more economical to install then the previous one. However, it could involve a greater head loss and increase correspondingly the energy requirement for blowing the fluidisation gas.

SUMMARY OF THE INVENTION

It is a object of the present invention to provide apparatus for the supply of unclogging gas to a fluidisation bed which avoids the complexity of the first solution and the head losses inherent to the second solution described above.

According to the present invention there is provided in a fluiudised bed apparatus comprising a grid for supporting particles to be fluidised, a plurality of blow openings formed in said grid each having a lower inlet, and a plurality of fluidisation gas supply tubes each connected to the lower inlet of a respective blow opening, each gas supply tube including arresting means for arresting the fall of particles through said tube, said means including a tubular end part connected to the lower inlet of the respective blow opening, the improvement comprising apparatus for unclogging the gas supply tubes said unclogging apparatus having a plurality of injection tubes each extending within a respective tubular end part, each injection tube being arranged to be connected to a source of unclogging fluid.

The source of unclogging fluid may be a source of compressed air or of various fluids such as the following: oxygen, methane, natural gas, coke over gas, water vapor, water, and the like.

The injection tube of apparatus of the invention has at least one lateral orifice. When there are several lateral orifices, they may be located at the same level or at different levels spaced along the length of the injection tube.

It is possible for the injection tube to have a length which enables it to extend into the opening for the fluidisation gas blowing air provided in the thickness of the grid.

It is particularly advantageous, especially in the case of an inverted truncated pyramid or truncated cone fluidisation grid enlarging upwards, for the length of the injection tube to be such that at least one orifice of this tube is in the region which extends between the upper face of the fluidisation grid and the useful lower limit of the arresting means for arresting the fall of particles.

It is common with some fluidisation grids that there is a piece of limited length with restricted cross-section in the erect tubular part, just before the connection of this tubular part with a corresponding opening of the grid. In this case, each injection tube is stopped, preferably, with an upper end part located within this restricted cross-section piece and which has an orifice located within this same piece.

In a preferred embodiment of the invention, the injection tube has a closed upper end, that is to say devoid of an extreme orifice, and there is at least one row of lateral orifices, preferably located in the immediate proximity of this closed upper end.

Preferably, the lateral orifices have a dimension in the direction of the longitudinal dimension of the injection tube, which is not greater than the thickness of the wall of this tube.

With such injection tubes, preferably arranged coaxially with the fluidisation grid openings, the unclogging or the loosening of particles accumulated in the stopping means is achieved without difficulty, without the need for the fluidisation gas inlet to be closed. Therefore, the individual valves which are commonly present in the fluidisation gas supply tube can be eliminated.

The supply of the unclogging gas into all injection tubes may be carried out with a single control for the whole grid; in practice, this leads to installing only one or two valves per grid, according to a simple scheme, which is inexpensive to achieve.

The device of the invention can be used with a wide range of fluidised bed heights. It has been confirmed experimentally that the height of the bed has practically no effect on the satisfactory unclogging achieved with injection tubes according to the invention.

BRIEF DESCRIPTION OF THE DRAWINGS

Embodiments of the invention will hereinafter be described, by way of example, with reference to the accompanying drawings, in which.

DESCRIPTION OF PREFERRED EMBODIMENTS

Figure 1:
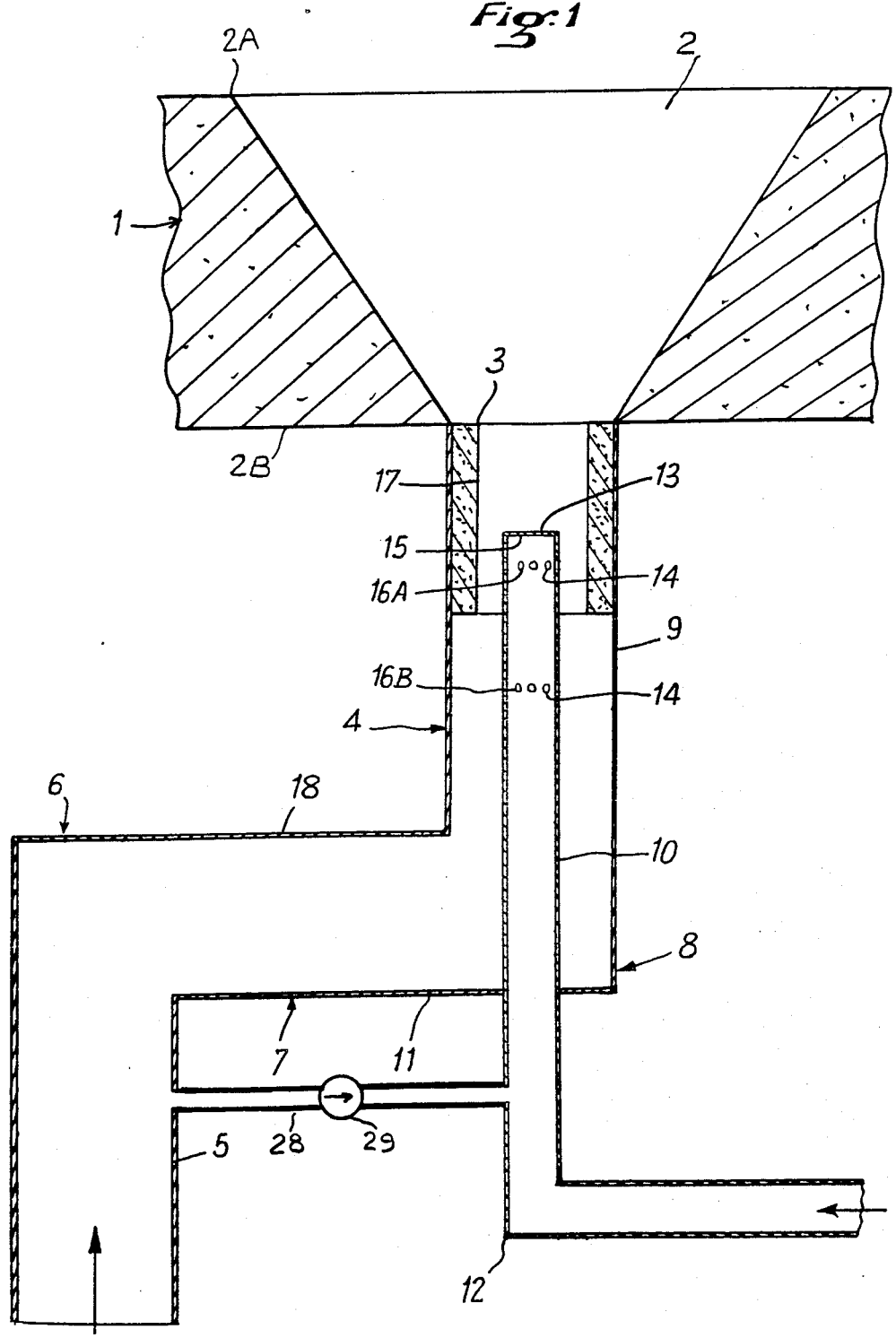
FIG. 1 shows diagramatically a vertical section of an inverted truncated pyramid opening of a fluidisation grid having a tube equipped with apparatus of the invention.
Figure 2:
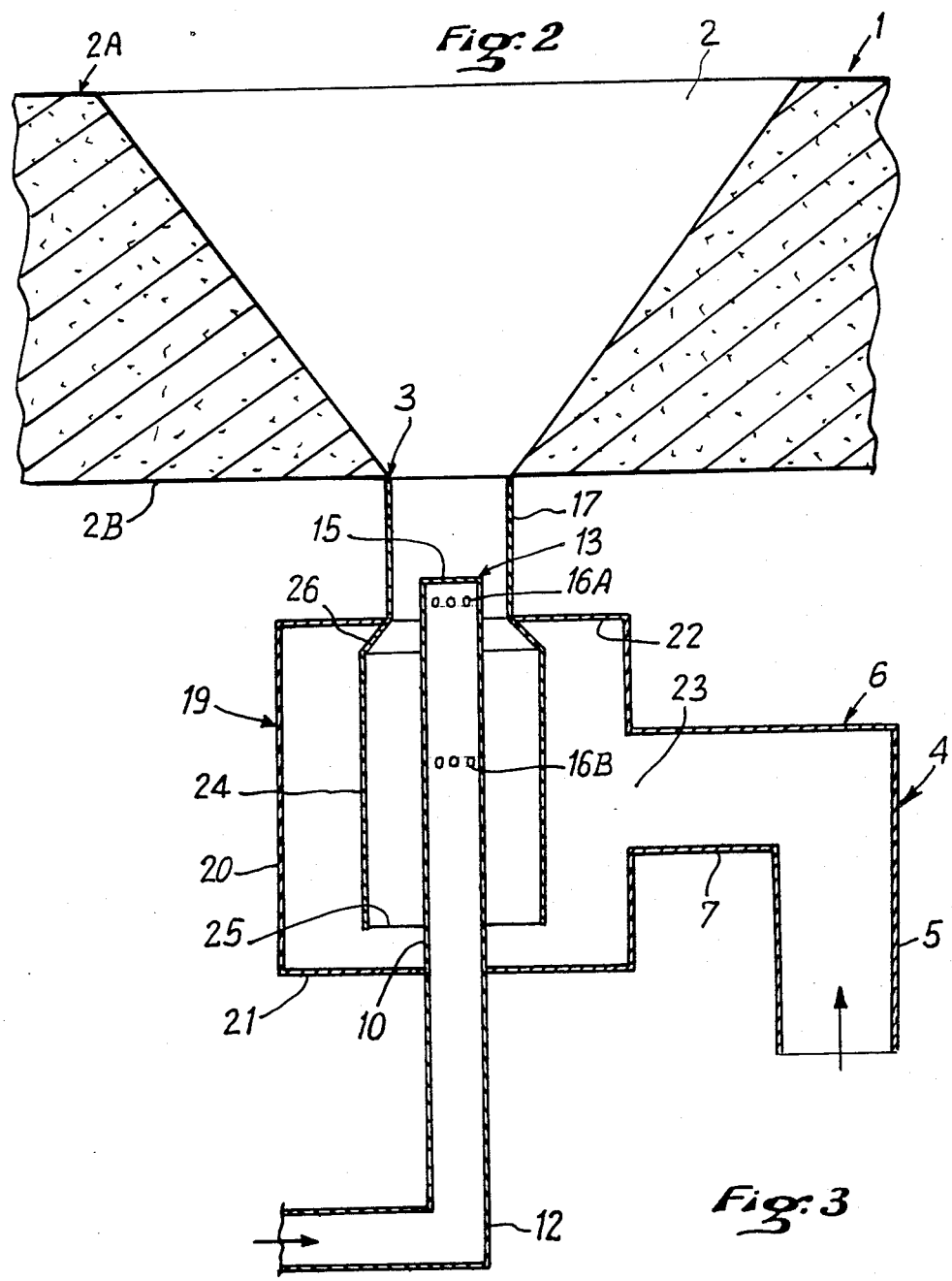
FIG. 2 is a view similar to FIG. 1, but the opening of the grid is supplied via a syphon equipped with apparatus of the invention.

A single inverted truncated pyramid forming part of a fluidisation grid 1 is represented in each of FIGS. 1 and 2.

In the embodiment illustrated in FIG. 1, the grid 1 has an upper face 2A in which the large upper base of each truncated pyramid opens. For example, this base may be a 215 mm sided square. Each inverted truncated pyramid is an opening 2 extending within the thickness of the grid 1 and opening in the lower face 2B of the grid 1 by way of a lower inlet 3 which has a diameter, for example, of 34 mm. The height of each truncated pyramid is 120 mm.

The supply of fluidisation gas to the grid is carried out by way of a collector (not shown) which is connected to the lower inlet 3 of each inverted truncated pyramid via a tube 4. This tube 4 has, in succession from the collector, a vertical part 5, a first 90° elbow 6, a generally horizontal intermediate connecting part 7, a second 90° elbow 8, and a vertical end part 9. The second elbow 8 consisting of the horizontal part 7 and the vertical end part 9 is provided to prevent solid particles from falling as far as into the collector during stoppages in the operation of the fluidisation equipment. Such particles accumulate in the second elbow 8 of each tube 4 and in the vertical end part 9.

An injection tube 10 is mounted to extend within the vertical end part 9. The tube 10 is preferably arranged to extend vertically and coaxially with the vertical part 9. Advantageously, the tube 10 passes through the lower wall 11 of the tube 4 in the region of the second elbow 8.

The injection 10 outside of the tube 4 is itself provided with an elbow 12 leading to a conduit (not shown) which is connected to a source of compressed air or of another gas suitable for unclogging the grid.

The part of the injection tube 10 within the tube 4 has an upper end 13 and has several lateral orifices 14 in its side wall. It is preferred to provide a wall 15 to close the end 13 of the tube 10. The lateral orifices 14 are arranged at different levels. In the present example, there are two vertically spaced rows 16A, 16B of lateral orifices 14.

In an example, the vertical end part 9 of the tube 4 has an internal diameter of 68 mm the lower inlet 3 is spaced 400 mm above the second elbow 8. The injection tube 10 advantageously has an external diameter of 13 mm and an internal diameter of 8 mm. The first row 16A includes 12 lateral orifices each 2.5 mm, in diameter and spaced from each other by approximately 3 mm, the row 16A being 10 mm below the upper end 13. The second row 16B of lateral orifices 14 is 120 mm below the first row 16A. Preferably, the row 16B includes a similar number of similar orifices to those of the first row 16A. The fluid leaving the injection tube under pressure from these orifices 14 has an initial horizontal direction which soon becomes vertical.

In the example described, the injection tube 10 does not extend beyond the lower inlet 3 of the openings provided in the fluidisation grid. In other circumstances, it is possible for the injection tube 10 to project through the lower inlet 3 and extends into the corresponding opening of the grid 1.

The cross-section of the vertical end part 9 of the tube 4 is usually contracted just upstream of the lower inlet 3 by a piece 17 of restricted length, which, in the example described here, has an internal diameter of 34 mm. The injection tube 10 ends within this reduced diameter piece 17. The upper end 13 is located approximately 5 mm below the lower inlet 3.

The dimensions given above are only specified by way of example. However, it is preferred that the injection tube 10 ends within the reduced diameter piece 17 when this piece is provided so that the upper row 16A of lateral orifices 14 is also within the reduced diameter piece 17.

In more general terms, the injection tube 10 should have a length such that at least one of its orifices can be located between a high level defined by the upper face 2A of the fluidisation grid 1 and a low level defined by the upper wall 18 of the horizontal part 7 of the tube 4. This upper wall 18 is referred to herein as the useful lower limit of the stopping means formed by the elbow 8 because, below this wall, the unclogging fluid is likely to enter into the horizontal part 7 and no longer have any real unclogging effect.

In the embodiment illustrated in FIG. 2, the descent of particles from the fluidised bed during stoppages in operation is prevented by a syphon generally indicated 19. In FIG. 2, parts which are substantially the same as parts in FIG. 1 are referred to by the same reference numerals and will not be described further. In practice, the syphon 19 replaces the second elbow 8. The syphon 19 includes a cylindrical jacket 20 closed at its lower end by a wall 21 and at its upper end by a wall 22. The horizontal part 7 of the tube 4 opens out, through an opening 23, into the lateral wall of this jacket 20. The jacket 20 houses and is coaxial with a vertical end piece 24 of a smaller diameter which extends through the upper wall 22. This piece 24 terminates in a lower edge 25 located at an intermediate level between the lower wall 21 and the lowest point of the opening 23 of the tube 4, which initiates the syphon effect. Therefore, the piece 24 is an internal partitioning of the syphon which ends with the lower edge 25. The lower edge 25 defines the useful lower limit of the syphon 19 for unclogging the fluidised bed. Similarly, any other means for stopping particles has a useful lower limit.

At its upper part, the piece 24 decreases in cross-section at 26 and passes through the upper wall 22 to form the piece 17 of reduced cross-section which ends at the lower inlet 3 of the fluidisation grid.

The injection tube 10 is identical to that which has been described above with reference to FIG. 1. The tube 10 passes through the lower wall 21 of the syphon 19 and extends coaxially within the piece 24 to end in its upper end 13 closed by the wall 15. This upper end 13 is located within the reduced diameter piece 17 below the lower inlet 3 of the fluidisation grid.

With a syphon in which the vertical end piece 24 performs the role of the vertical end part 9 of the embodiment of FIG. 1, the high level at which at least one orifice of the injection tube 10 may be present is always the upper face 2A of the grid 1 and its low level is the level of the lower edge 25 of the internal partitioning of the syphon.

Irrespective of the particular means (an elbow 8 or a syphon 19) connected to the lower inlet 3 of the grid by way of an erect tubular end part and arranged to arrest the fall of particles from the fluidised bed during stoppages in operation, the injection tube 10 is always arranged within this erect tubular end part. Preferably, the injection tube 10 extends coaxially with the erect tubular end part and with the corresponding opening of the grid.

After a stoppage in operation, the bed above the grid is refluidised simply by supplying compressed air to all the injection tubes 10 in a single operation and by supplying fluidisation gas to the tubes 4.

Figure 3:
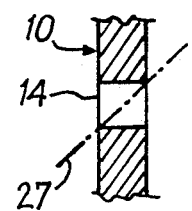
FIG. 3 is an enlarged detailed view of a lateral orifice of an injection tube.

Although each injection tube 10 can have an extreme orifice for the passage of the unclogging gas, it is preferable to use the lateral orifices 14. As shown in FIG. 3, it is also preferred for each lateral orifice 14 to have a diameter which is at the most substantially equal to the thickness of the wall of the injection tube 10. In practice, it has been observed that such a measure results in the slope angle indicated with a dot-and-dash line 27 preventing the particles from penetrating into the injection tube 10. This slope angle is that of the particles which descend and accumulate in the annular space around the injection tube 10.

The words "horizontal" and "vertical" have been used during the description in order to simplify it. They do not imply a strict position of the parts to which they are applied. These parts may have an actual direction ranging from perfectly horizontal to perfectly vertical.

On the FIG. 1 only is represented a further tube 28 which connects the tube 4 at a point below its elbow 6 to the injection tube 10 at a point above its elbow 12. On this further tube 28 is mounted a non-return valve 29. The latter enables the fluidization gas to enter into the injection tube 10 and prevents the compressed gas coming by the injection tube 10 to enter into the tube 4.

This kind of variant is useful mainly when the fluidized bed comprises numerous fines particles which accumulate around the injection tube 10 and does not make a slope angle in the lateral orifices 14 but descend in the injection tube 10 instead.

For starting after a stoppage in operation, the fluidization gas is first allowed to enter into the tube 4; it does not unclog the accumulated particles but it flows around them and establishes a same pressure inside the tube 4 nd the injection tube 10. This equalization of the pressure inside both tubes enhances the effect of the compressed air supplied then to the injection tube 10 for unclogging the particles.

We claim:

1. A fluidized bed apparatus comprising:
   a grid having an upper face for supporting particles to be fluidized and having at least one concavity defined therein, each said concavity having a lower inlet so that each said concavity defines a blow opening of the grid,
   a fluidization gas supply tube connected to each said lower inlet of each said at least one concavity, respectively, each said gas supply tube being open towards said particles to be fluidized so that at least some of the said particle fall thereinto and including limiting means for stopping the fall of particles through said tube, and
   an unclogging apparatus for each said gas supply tube including an injection tube coming from a source of unclogging fluid, passing through the wall of said gas supply tube and disposed inside said supply tube, said injection tube having at least one lateral orifice located between said upper face of the grid and the limiting means, the upper end of said injection tube being closed, said gas supply tube limiting the unclogging effect of said unclogging apparatus at a useful lower limit.

2. Apparatus according to claim 1, wherein each said gas supply tube comprises a tube of a first cross-section, and a tube of reduced cross-section, said tube of reduced cross-section being connected to the lower inlet of the corresponding concavity of the grid, and wherein there are a plurality of lateral orifices located between said upper face of the grid and the limiting means, at least one of said orifices being located within said piece of reduces cross-section.

3. Apparatus according to claim 2, wherein said plurality of lateral orifices comprises two circular rows of lateral orifices, the rows being spaced apart in the longitudinal direction of the tube, the upper row of orifices being located in the reduced cross-section piece and the lower row of orifices being located below said reduced cross-section piece.

4. Apparatus according to any one of claims 2, 3, or 1, wherein each said lateral orifice has a dimension in the longitudinal direction of the injection tube which is less than or equal to the thickness of the wall of said injection tube.

5. An apparatus according to claim 1, wherein said gas supply tube includes an elbow joint so as to define a substantially horizontal tube portion with an upper wall, said elbow joint providing said limiting means and said upper wall defining said lower limit.

6. An apparatus according to claim 1, wherein said gas supply tube includes a syphon portion having an internal partition with a lower edge, said syphon providing said limiting means and said lower edge defining said lower limit.

7. An apparatus according to claim 1 further comprising a connecting tube mounted to said gas supply tube and to said injection tube, and a nonreturn valve mounted along the length of said connecting tube for enabling the fluidization gas to enter into the injection tube and for preventing the unclogging fluid from entering said gas supply tube through said connecting tube.

* * * * *